May 27, 1930.  E. E. PEET  1,760,716

MILKING STOOL

Filed Sept. 20, 1929

INVENTOR.
ED E. PEET
BY
Irving L. McCathran
ATTORNEYS.

Patented May 27, 1930

1,760,716

UNITED STATES PATENT OFFICE

ED E. PEET, OF CHETEK, WISCONSIN

MILKING STOOL

Application filed September 20, 1929. Serial No. 394,016.

This invention appertains to dairying and more particularly to an improved combination milking stool and milk pail holder.

One of the primary objects of my invention is the provision of novel means for associating a milk pail with a milking stool whereby the milk pail can be conveniently and quickly raised or lowered on the milk stool so as to position the milk pail to the best advantage according to the particular size of a cow.

Another important object of my invention is the provision of novel means for associating a pail holder with a milking stool, whereby various sizes of milking pails can be conveniently associated with the stool and held in proper position and against accidental tipping movement incident to the kicking of the cow or the like.

A further salient object of my invention is the provision of a combination milk stool and milk pail holder, the milk pail holder embodying a substantially U-shaped bail or strap having the arms thereof pivotally connected to the forward end of the milk stool for receiving the pail, one of said arms being provided with an adjusting lever whereby the bail or strap can be raised or lowered for facilitating the raising or lowering of the pail, the stool and lever having cooperating means for holding the lever in any preferred adjusted position.

A still further object of my invention is to provide a novel combination milk pail holder and milking stool of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:—

Referring to the drawing in detail, wherein similar reference characters designate corresponding parts throughout the several views, the letter A generally indicates a milking stool; B my improved milk pail holder associated therewith and C a milk pail.

Figure 1:
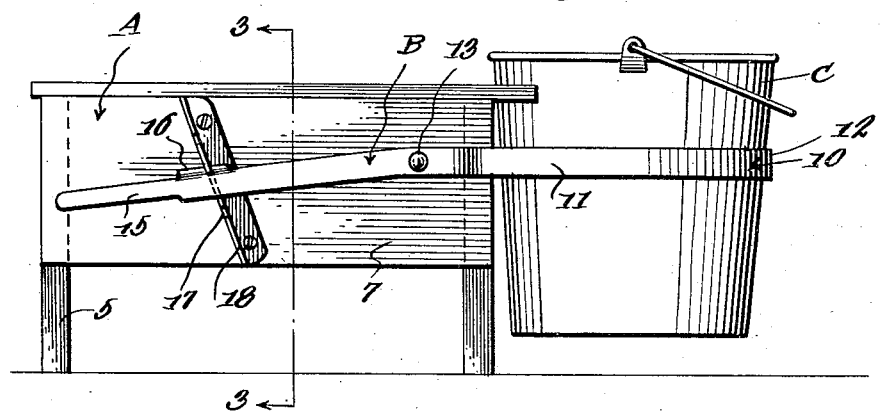
Figure 1 is a side elevation of my improved milking stool and milk pail holder.

The milk pail C can be of any preferred character or size and has merely been illustrated to show the use of my improved device.

The milk stool A can be of any preferred character or size and as shown in the drawing the same includes end walls 5 having the lower ends thereof shaped to provide feet or legs 6. Secured to the edges of the end walls 5 are the side walls 7 and the walls 5 and 7 support the seat plate 8. In accordance with my invention the seat plate 8 is extended slightly beyond one of the end walls 5 and has its forward edge arcuated as at 9 to conform to the configuration of the milk pail C.

Figure 2:
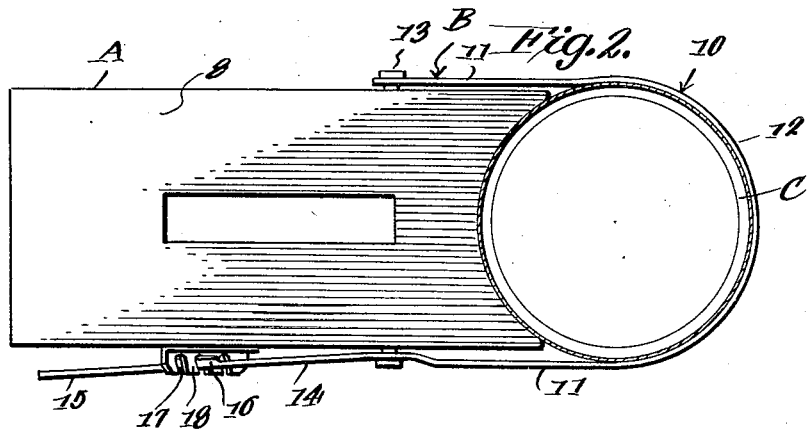
Figure 2 is a top plan view of the same showing the milk pail in horizontal section.
Figure 3:
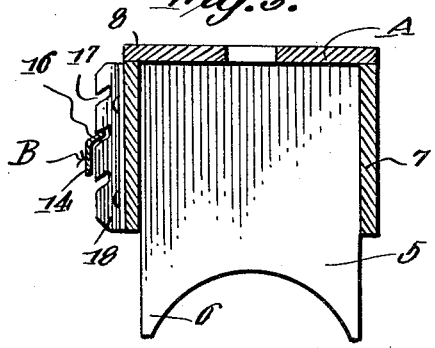
Figure 3 is a vertical section through the milking stool and milk pail holder taken on the line 3—3 of Figure 1 looking in the direction of the arrows.

The improved milk pail holder B comprises a substantially U-shaped bail, yoke or strap 10. This U-shaped bail, yoke, or strap 10 includes substantially parallel arms 11 and the connecting arcuate bight portion 12 which in connection with the arcuate forward end 9 of the seat plate 8 forms a substantially circular opening in plan for the reception of the milk pail C, as can be readily seen by referring to Figure 2 of the drawing. The rear ends of the arms 11 are connected to the side walls 7 of the stool below the seat plate 8 by means of headed pivot pins 13, so that the bail, yoke or strap 10 can be raised and lowered. The rear end of one arm 11 is provided with a rearwardly extending operating lever 14 which is arranged along side of one side wall 7 of the stool. This lever is disposed in rear of the pivot pin 13 and has its rear end provided with a manipulating handle 15. This lever is of a resilient nature and has its upper edge bent to provide a tooth or dog 16 which is adapted to engage in any one of a plurality of downwardly inclined notches 17 formed in an inclined bar 18 secured to the adjacent side wall 7. This bar 18 can be of angle iron construction and the notches 17 can be formed in one flange thereof. It is obvious that when the tooth or dog 16 is in any one of the notches 17 that the bail, yoke or strap 10 will be held in an adjusted position.

In use of my improved stool, the milker sits on the stool 8 in the ordinary manner and the pail C is placed in the yoke or bail 10 between the arcuate portion 12 thereof and the arcuate front edge 9 of the seat plate 8. By raising or lowering the lever 14 the pail can be raised or lowered so as to adjust the position thereof and different size pails, can also be securely held in place by the bail according to the position thereof relative to the front edge of the seat plate.

From the foregoing description, it can be seen that I have provided a novel combination milk stool and milk pail holder in which the pail can be readily raised or lowered by the manipulation of a lever arranged along side of the stool.

Changes in details may be made without departing from the spirit or the scope of this invention, but:—

What I claim as new is:

1. In a device of the class described, a milking stool and a milk pail holder including a substantially U-shaped yoke having the rear ends of the arms thereof pivotally secured to the sides of the stool, a rearwardly extending resilient lever connected with one of said arms in rear of the pivot point thereof and extending along side of the stool, a dog carried by the lever, and a bar secured to one side of the stool having a plurality of notches therein for the reception of said dog.

2. In a device of the class described, a milking stool including a top plate provided with an arcuate edge, a milk pail holder including a yoke having parallel arms and a connecting arcuate bight portion arranged forwardly of the arcuate edge of the top plate, means pivotally connecting the rear ends of the arms to the sides of the stool, an operating hand lever rigidly connected to one of said arms in rear of its pivot for swinging the yoke in a vertical plane relative to the arcuate edge of the top plate, and means for holding the lever in a selected adjusted position.

In testimony whereof I affix my signature.

ED E. PEET.